(12) United States Patent
Roberts et al.

(10) Patent No.: US 8,917,908 B2
(45) Date of Patent: Dec. 23, 2014

(54) DISTRIBUTED OBJECT TRACKING FOR AUGMENTED REALITY APPLICATION

(75) Inventors: Michael Roberts, Los Gatos, CA (US); Doron Kletter, San Mateo, CA (US); Anselm Hook, Palo Alto, CA (US); James M. A. Begole, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 216 days.

(21) Appl. No.: 13/548,092

(22) Filed: Jul. 12, 2012

(65) Prior Publication Data

US 2014/0016820 A1    Jan. 16, 2014

(51) Int. Cl.
*G06K 9/00*    (2006.01)
(52) U.S. Cl.
USPC ............................................. 382/103
(58) Field of Classification Search
None
See application file for complete search history.

(56) References Cited

U.S. PATENT DOCUMENTS

| | | | |
|---|---|---|---|
| 2006/0143560 A1* | 6/2006 | Gupta et al. | 715/512 |
| 2011/0211036 A1* | 9/2011 | Tran | 348/14.08 |
| 2014/0029801 A1* | 1/2014 | Chua et al. | 382/103 |

* cited by examiner

*Primary Examiner* — Amara Abdi
(74) *Attorney, Agent, or Firm* — Shun Yao; Park, Vaughan, Fleming & Dowler LLP

(57) ABSTRACT

One embodiment of the present invention provides a system for tracking and distributing annotations for a video stream. During operation, the system receives, at an annotation server, the video stream originating from a remote field computer, extracts a number of features from the received video stream, and identifies a group of features that matches a known feature group, which is associated with an annotation. The system further associates the identified group of features with the annotation, and forwards the identified group of features and the annotation to the remote field computer, thereby facilitating the remote field computer to associate the annotation with a group of locally extracted features and display the video stream with the annotation placed in a location based at least on locations of the locally extracted features.

15 Claims, 6 Drawing Sheets

DISTRIBUTED OBJECT TRACKING FOR AUGMENTED REALITY APPLICATION

BACKGROUND

1. Field

This disclosure is generally related to a system for generating augmented reality. More specifically, this disclosure is related to a distributed system for generating augmented reality.

2. Related Art

Augmented reality (AR) enhances a user's perception of the real world by superimposing computer-generated sensory input, such as sound, video, graphics, or GPS data, over a real-world environment in real time. Current augmented reality solutions generally run on a single machine/device. More specifically, a camera mounted on the device perceives scenes of the real-world environment and transmits its output to a tracking module (of the device), which identifies features in the real-world images and then aligns a plurality of computer-generated objects in 3D space with the scenes being tracked, based on an analysis of the relevant positions of the features in the real-world images, sometimes assisted by a 3D model. Finally, a rendering engine (on the device) renders the scenes with the objects in the positions/orientations determined by the tracking module on top of the real-world images, generating the appearance of virtual objects integrated with the real-world scenes. However, the increased prevalence of networked personal video cameras (often associated with smartphones) means that the single machine is not appropriate in all situations.

SUMMARY

One embodiment of the present invention provides a system for tracking and distributing annotations for a video stream. During operation, the system receives, at an annotation server, the video stream originating from a remote field computer, extracts a number of features from the received video stream, and identifies a group of features that matches a known feature group, which is associated with an annotation. The system further associates the identified group of features with the annotation, and forwards the identified group of features and the annotation to the remote field computer, thereby facilitating the remote field computer to associate the annotation with a group of locally extracted features and display the video stream with the annotation placed in a location based at least on locations of the locally extracted features.

In a variation on this embodiment, the system further receives, from a client computer, a video frame, which includes annotations added by a user of the client computer, extracted from the video stream, and attaches the annotations to corresponding features within the video frame based on one or more user-definable rules associated with the annotations.

In a further variation, the system receives, from the user, updates to the annotations, and reattaches the updated annotations to features within the video frame.

In a further variation, the system receives, from the user, updates to the user-definable rules, and reattaches the annotations to features within the video frame based on the updated user-definable rules.

In a further variation, the system stores the corresponding features and the attached annotations as known features in a database.

In a variation on this embodiment, the system tracks the identified group of features frame by frame in the received video stream.

In a variation on this embodiment, the system receives the video stream from a video reflector, which reflects the video stream originating from a remote field computer to the annotation server and at least one other client computer.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a distributed system for providing augmented realities. The system includes a field client, a reflector, an augmented reality (AR) server, and a number of web clients. During operation, a camera mounted on the field client shoots videos of the real-world environment. The videos are streamed live from the field client to a video reflector. The video reflector receives the live video stream, and forwards the video stream to the AR server and the web clients. Note that the reflector and AR server can be embodied in the same server implementation. The AR server also includes a feature detector capable of matching the incoming video stream with a list of features (such as edges, corners, shapes, etc.) that have been connected to or associated with annotations. The AR server is also responsible for determining the positions of the annotations, receiving annotation alterations from the web clients, and communicating changes to the annotations to all clients.

Distributed Object-Tracking System

One key challenge for creating an augmented reality is to maintain accurate registrations between the real-world scene and the computer-generated objects. As users move their viewpoints, the computer-generated graphic elements must retain their alignment with the observed 3D positions and orientations of the objects in the real-world scene. To do so, it is important to track the locations and orientations of the real-world objects continuously.

As networked video cameras (such as WiFi-enabled surveillance cameras) and cameras attached to IP-enabled mobile devices (such as smartphones) become widely available, AR systems may rely on videos captured by these cameras to provide the real-world scenes for an AR. However, the cameras or the mobile devices that the cameras are attached to may not have sufficient computational power to track the locations of the orientations of the real-world objects in the videos and to attach annotations to those objects, particularly when sophisticated image-analysis methods are employed. To overcome such obstacles, in embodiments of the present invention, the object-tracking and annotation-attachment functions are realized by a remote server having sufficient computational power.

Figure 1:
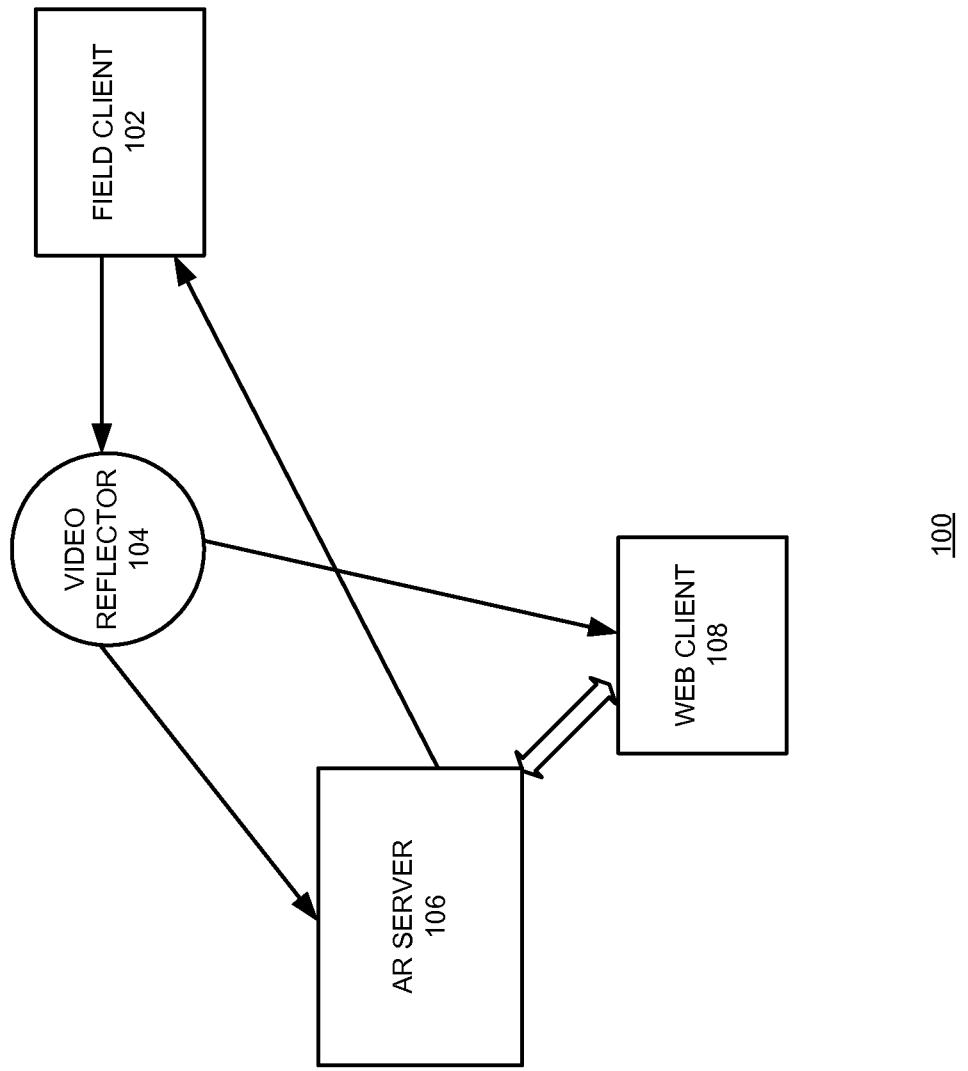
FIG. 1 presents a diagram illustrating an exemplary distributed object-tracking system for augmented reality, in accordance with an embodiment of the present invention.

FIG. 1 presents a diagram illustrating an exemplary distributed object-tracking system for augmented reality, in accordance with an embodiment of the present invention. Distributed object-tracking system 100 includes a number of clients, such as a field client 102 and a web client 108, a video reflector 104, and an AR server 106.

Field client 102 can be any type of computing device that is equipped with a video camera. For example, field client 102 can include, but is not limited to: a web-enabled surveillance camera; a conventional webcam hosted by a personal computer (PC), a laptop computer, or a tablet computer; and a smartphone. In one embodiment, field client 102 is a head-mounted computer (HMC), such as a Motorola™ Golden-i head-mounted computer, which allows a user to operate a cursor by moving his head and accepts voice commands. These hands-free features allow the user of field client 102 to operate the computer while engaging in certain actions, such as servicing a piece of equipment or performing a medical procedure.

During operation, field client 102 is responsible for capturing videos reflecting the real-world scenes (such as the equipment being serviced or a surgical scene) and streaming the videos to video reflector 104. Note that, compared with the conventional AR system where the camera and the object-tracking module are collocated on a single machine having sufficient computational power for feature tracking, the limited computational power of field client 102 means that field client 102 can only perform certain lightweight feature correspondence, such as extracting features, including edges, corners, shapes, etc., from the videos. These features are expressed as vectors (using feature descriptors) in the feature space. Instead of mapping the extracted features to known annotations, field client 102 receives such mapping results (which include the features and their associated annotations) from a remote server, such as AR server 106, and displays these features and annotations over the real-world videos to allow a user of field client 102 to experience the augmented reality.

Video reflector 104 is responsible for receiving videos from video senders, such as field client 102, and sending the received videos to AR server 106 and other clients, such as web client 108. In one embodiment, video reflector 104 can also resample the received video to achieve a desired frame rate or size. Video reflector can be a standalone device, or it can reside on field client 102 or AR server 106.

Web client 108 can be an electronic device that receives video streams from video reflector 104, presents the video streams to a user (such as an expert), receives annotations for the videos from a user, and sends the annotations to AR server 106. In one embodiment, web client 108 subscribes to video sources, which can be video reflector 104 or AR server 106, and receives the video subscriptions once they are available.

When viewing the streamed video, which can be a live video steam from field client 102, a user of web client 108 can add annotations to the video stream. For example, to explain to a remote trainee how to service a piece of equipment, an expert user may draw an arrow pointed to a certain feature (such as a button or a handle bar) in a video frame showing the piece of the equipment. Web client 108 further displays these annotations on top of the video (either in the form of 2D objects or in the form of 3D pose-locked objects) to its users. In addition, web client 108 captures interactions between the user and the annotations, and transmits the annotations including the changes to AR server 106. For example, a user may, while viewing the annotated video via web client 108, drag an annotation (which can be expressed as a 2D object) within a frame to a new location; or he may add reference information (as an annotation or a tag) describing the frame (such as associating certain features with a name). The modifications to the annotation and the reference information are sent to AR server 106 and cause the feature-matching rules to be applied and the object to be bound to the features in the frame. Consequently, AR server 106 is able to track these features frame by frame. Another function of web client 108 is to receive user-defined feature-matching rules and send these user-defined rules to the rule-based feature-matching system located on AR server 106.

AR server 106 performs the heavyweight image-processing tasks, including feature detections, on the videos. More specifically, AR server 106 includes a feature-detection module that maps the features to the annotations using a rule-based system, which can reside on AR server 106. During operation, AR server 106 receives annotated video frames from web client 108, and binds the annotations to features in the corresponding video frames. In one embodiment, binding the annotation to features is performed by the rule-based system. The rule-based system stores the feature mapping rules, and applies these rules to the extracted features. For example, a rule for a text annotation may require a "match to all the features defined by a rectangular area," and a rule for an arrow annotation may involve "pointing the arrow at the large major feature found near the tip of the arrow." Note that in one embodiment the rule-based system continues to receive feature-mapping rules from a user who views the video via web client 108. Once the annotations are bound to the features, AR server 106 is able to track these features even after their positions and orientations have changed in later frames. For example, once an arrow is bound to a feature, such as a button on a piece of equipment, even if the button is shown at a different location in later received video frames, AR server 106 can correctly align that arrow to the button in those later received video frames. The binding between the features and the annotations can be stored in the rule-based system.

In the meantime, AR server 106 concurrently streams videos from video reflector 104, extracts features from the incoming videos, and maps the extracted features against a list of known features (which have been previously bounded or associated with annotations). Note that the annotations can be the name of a feature or additional information associated with the feature.

AR server 106 may receive real-time annotation updates via interactions with a client (either field client 102 or web client 108). For example, while viewing the augmented reality, a user may want to change the annotation of a feature. The updating of the annotations triggers the rule-based feature-matching system to determine matching features of the updated annotations. In one embodiment, in order to maintain coherence to changes made to the features at the clients, AR server 106 maintains a short history of frames of the video. Note that, in general, consecutive frames have a large number of features in common. After mapping, the features (as a vector) along with the mapped annotations are sent back to the clients, including field client 102 and web client 108. Each client then displays the annotations along with the features in the real-world scene accordingly to allow a user of the client to experience augmented reality.

In some embodiments, field client 102 and web client 108 are client computers that interact with AR server 106 in a client-server architecture. A given client computer may include one or more software applications that are resident on and which execute on the given client computer. A particular software application may be a standalone program or may be embedded in another software application. Alternatively, the software application may be a software-application tool that is embedded in a web page (e.g., the software application may execute in an environment provided by a web browser).

Figure 2:
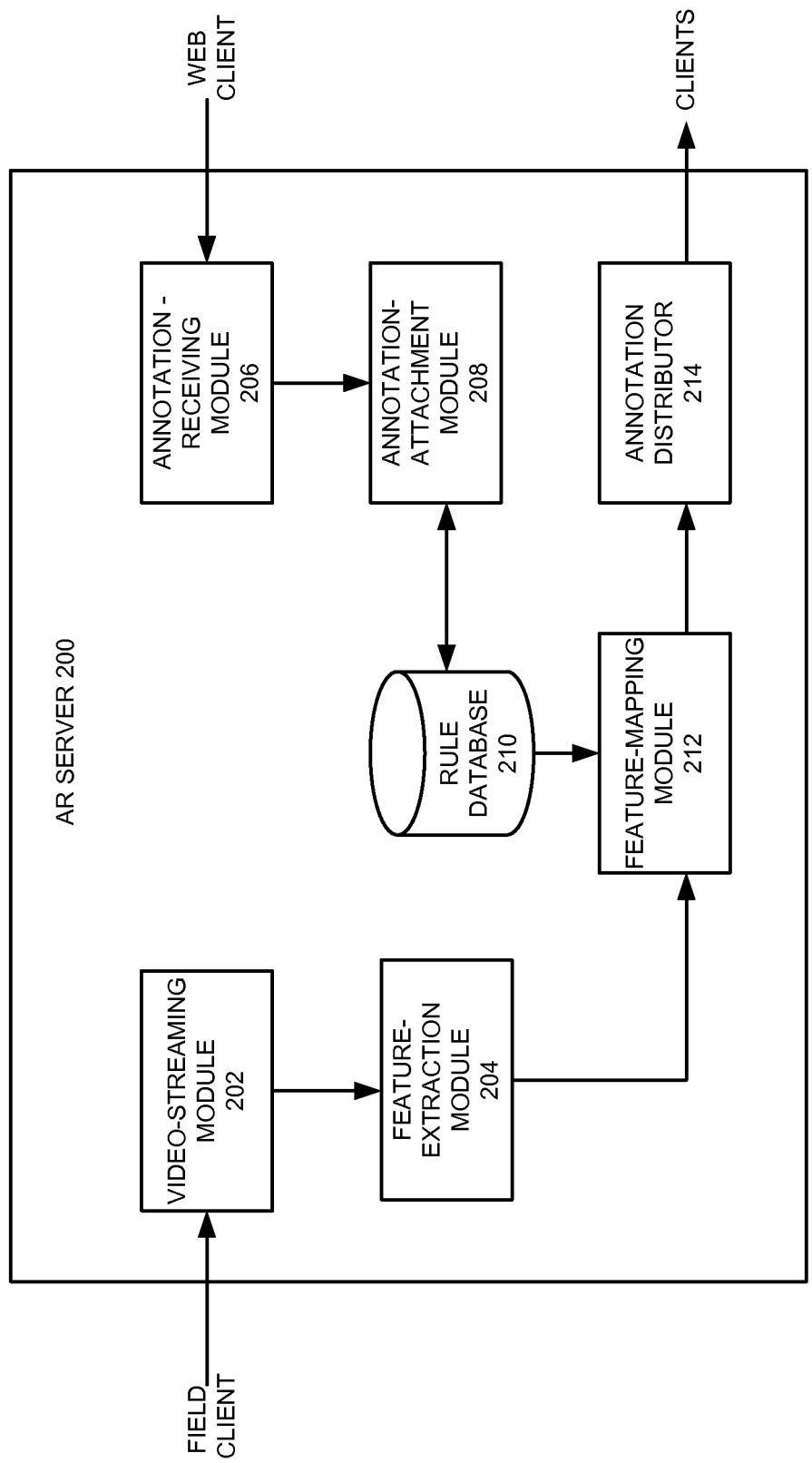
FIG. 2 presents a diagram illustrating the architecture of an exemplary augmented reality server, in accordance with an embodiment of the present invention.

FIG. 2 presents a diagram illustrating the architecture of an exemplary augmented reality server, in accordance with an embodiment of the present invention. AR server 200 includes a video-streaming module 202, a feature-extraction module 204, an annotation-receiving module 206, an annotation-attachment module 208, a rule database 210, a feature-mapping module 212, and an annotation distributor 214.

Video-streaming module 202 is responsible for streaming videos reflecting real-world scenes from a video reflector, which receives the videos from a remote video source, such as a field client. The video streams are sent to feature-extraction module 204, which extracts features of the real-world scenes from the video streams.

Annotation-receiving module 206 receives annotations authored by a user (often an expert) from a web client. Note that the web client concurrently streams the real-world videos from the video reflector, and the user of the web client views the video and adds annotations on top of one or more video frames. In one embodiment, the annotations may include 2D or 3D objects. Examples of annotations may include, but are not limited to: text descriptions, audio clips, arrows, circles, boxes, and other shapes. The received annotations are sent to annotation-attachment module 208, which is responsible for attaching (or locking) the annotations to corresponding features using rules stored in rule database 210. The results of the annotation attachment (which describes which annotation is attached to what features) are stored in rule database 210. Note that the annotations and the rules can be updated by the expert user, and each annotation update results in the rules being applied to determine features that match the updated annotations.

Once the annotations have been attached to corresponding features, these annotations can be correctly aligned to the same features in the subsequently received video frames, even after the features have changed their locations and orientations in the subsequent frames. This is achieved by feature-mapping module 212. More specifically, feature-mapping module 212 receives extracted features from feature-extraction module 204, and determines which features match the annotations based on the previously determined annotation-feature attachment results stored in rule database 210. In one embodiment, feature-mapping module 212 uses a previously constructed 3D model to track features frame by frame.

Outcomes of the feature mapping are sent to annotation distributor 214, which distributes the annotations along with the attached features to the clients, including the field client and the web client. Note that each client also maintains a list of locally extracted features. Hence, by comparing the local list with the annotation-feature-mapping result sent by annotation distributor 214, each client is able to associate annotations with the local features, and display the annotations on top of the real-world scenes with the annotations correctly aligned to the corresponding features.

Figure 3:
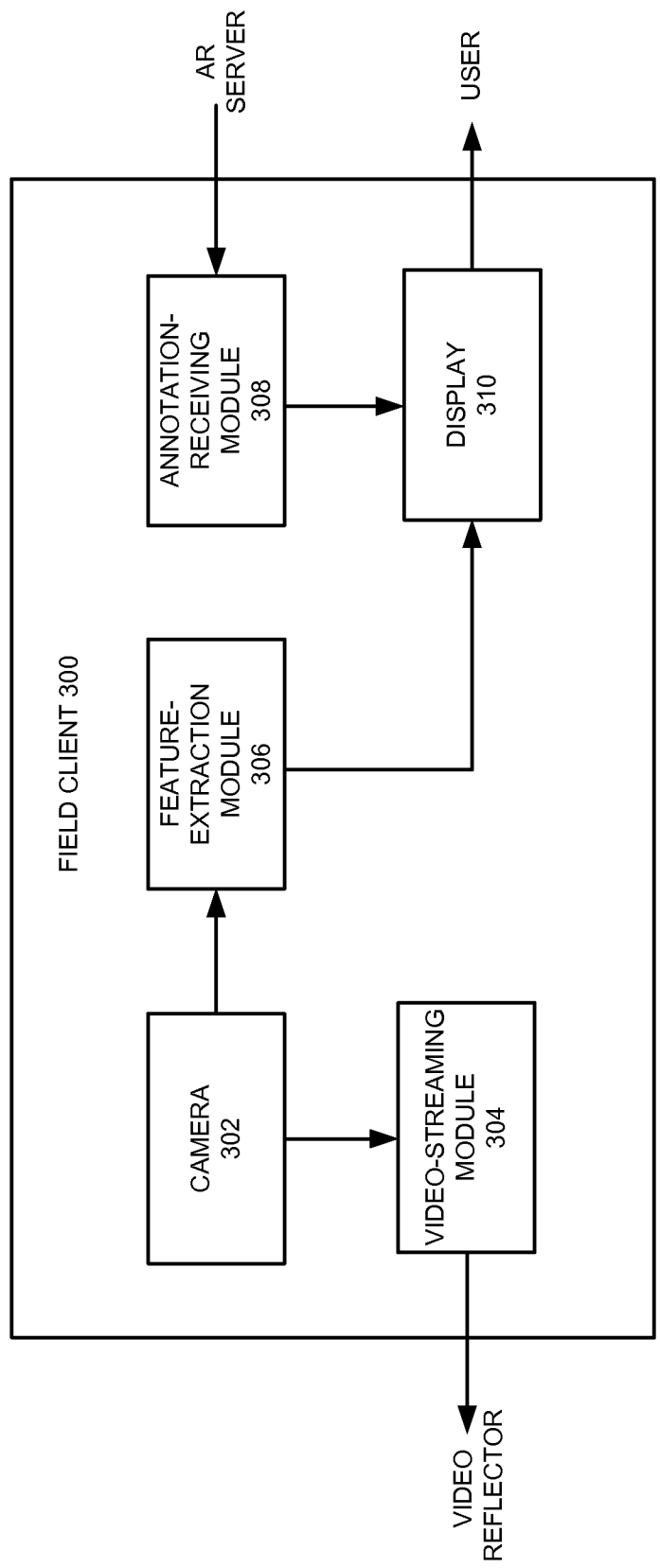
FIG. 3 presents a diagram illustrating the architecture of an exemplary field client, in accordance with an embodiment of the present invention.

FIG. 3 presents a diagram illustrating the architecture of an exemplary field client, in accordance with an embodiment of the present invention. Field client 300 includes a camera 302, a video-streaming module 304, a feature-extraction module 306, an annotation-receiving module 308, and a display 310.

During operation, camera 302 records real-world video scenes, and video-streaming module 304 streams the videos to a video reflector, which in turn forwards the videos to an AR server and a web client. Feature-extraction module 306 extracts features from the videos Annotation-receiving module 308 receives annotations and the annotation-feature-mapping result from the AR server. Display 310 displays the received annotations on top of the videos based on the extracted features and the annotation-feature-mapping result, thus enabling a user of field client 300 to experience the augmented reality.

Figure 4:
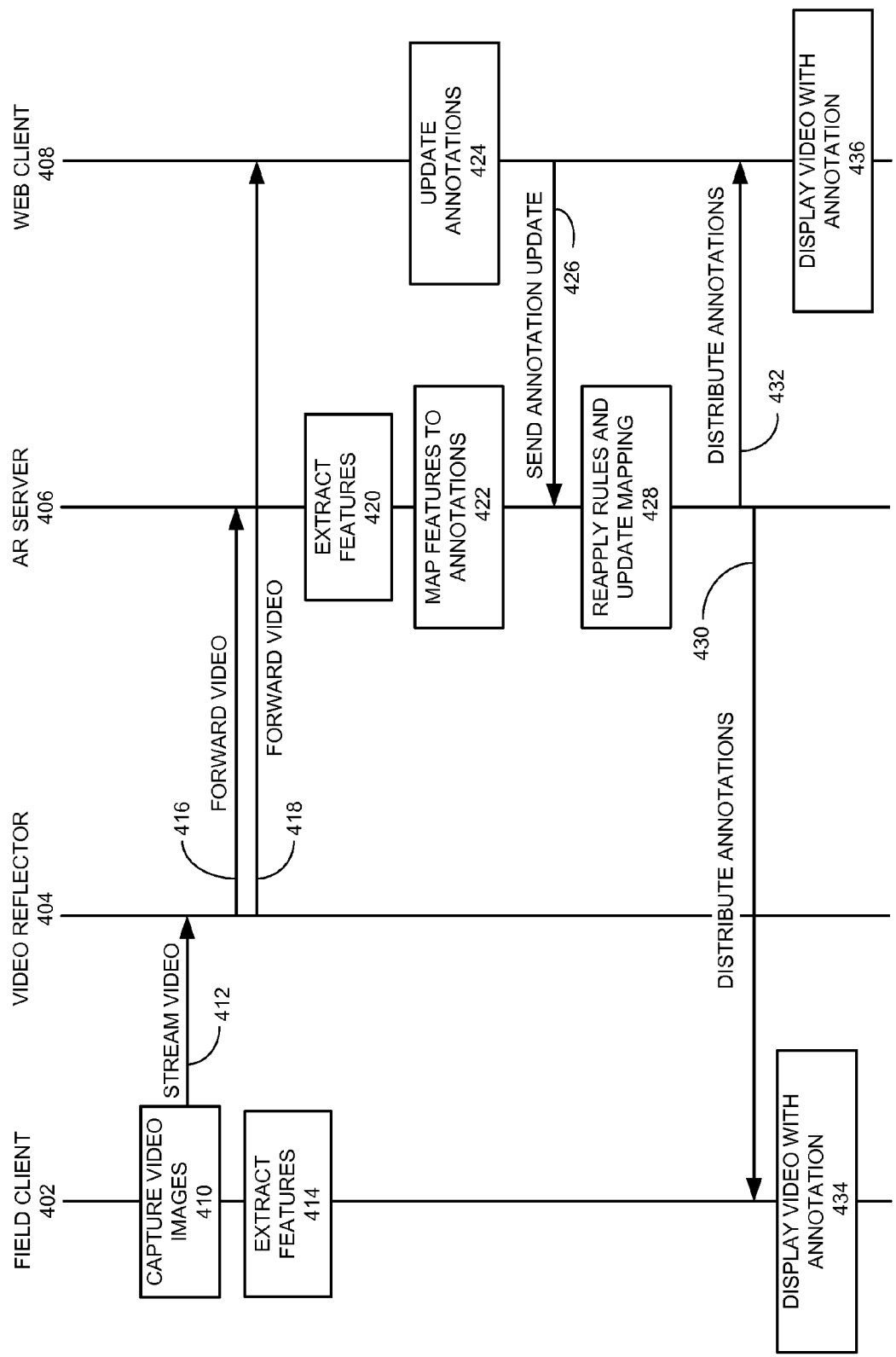
FIG. 4 presents a time-space diagram illustrating the distributed object-tracking process, in accordance with an embodiment of the present invention.

FIG. 4 presents a time-space diagram illustrating the distributed object-tracking process, in accordance with an embodiment of the present invention. During operation, a field client 402 captures video frames reflecting the real-world scenes (operation 410), and concurrently streams the captured video frames to a video reflector 404 (operation 412). Field client 402 can be a head-mounted computer, a webcam hosted by a PC, a mobile computing device equipped with a camera, or a web-enabled wired or wireless surveillance camera. Field client 402 also performs certain lightweight image-processing operations, such as extracting features from the video frames (operation 414). In one embodiment, field client 402 also detects the orientation of the camera relative to an object within a video frame.

Video reflector 404 forwards the video streams to AR server 406 and web client 408 (operations 416 and 418, respectively).

AR server 406 extracts features from the received videos (operation 420), and performs feature detection, which involves extracting features and mapping the features to available annotations, on the video streams (operation 422). In one embodiment, a rule-based system is used to map features to annotations. The rule-based system resides on AR server 406 and stores a list of features that have been previously associated with annotations.

A user of web client 408 views videos along with the annotations and updates/modifies the annotations (operation 424). For example, an annotation object may be dragged to a new location or new annotations may be added. Web client 408 subsequently sends the annotation update to AR server 406 (operation 426). The annotation update triggers AR server 406 to reapply annotation-feature-attachment rules and update the mapping between the features and annotations (operation 428). AR server 406 then distributes the annotations along with the annotation-feature mapping to field client 402 and web client 408 (operations 430 and 432, respectively). Field client 402 and web client 408 then display the videos with annotations correctly aligned with their matching features (operations 434 and 436, respectively).

Figure 5:
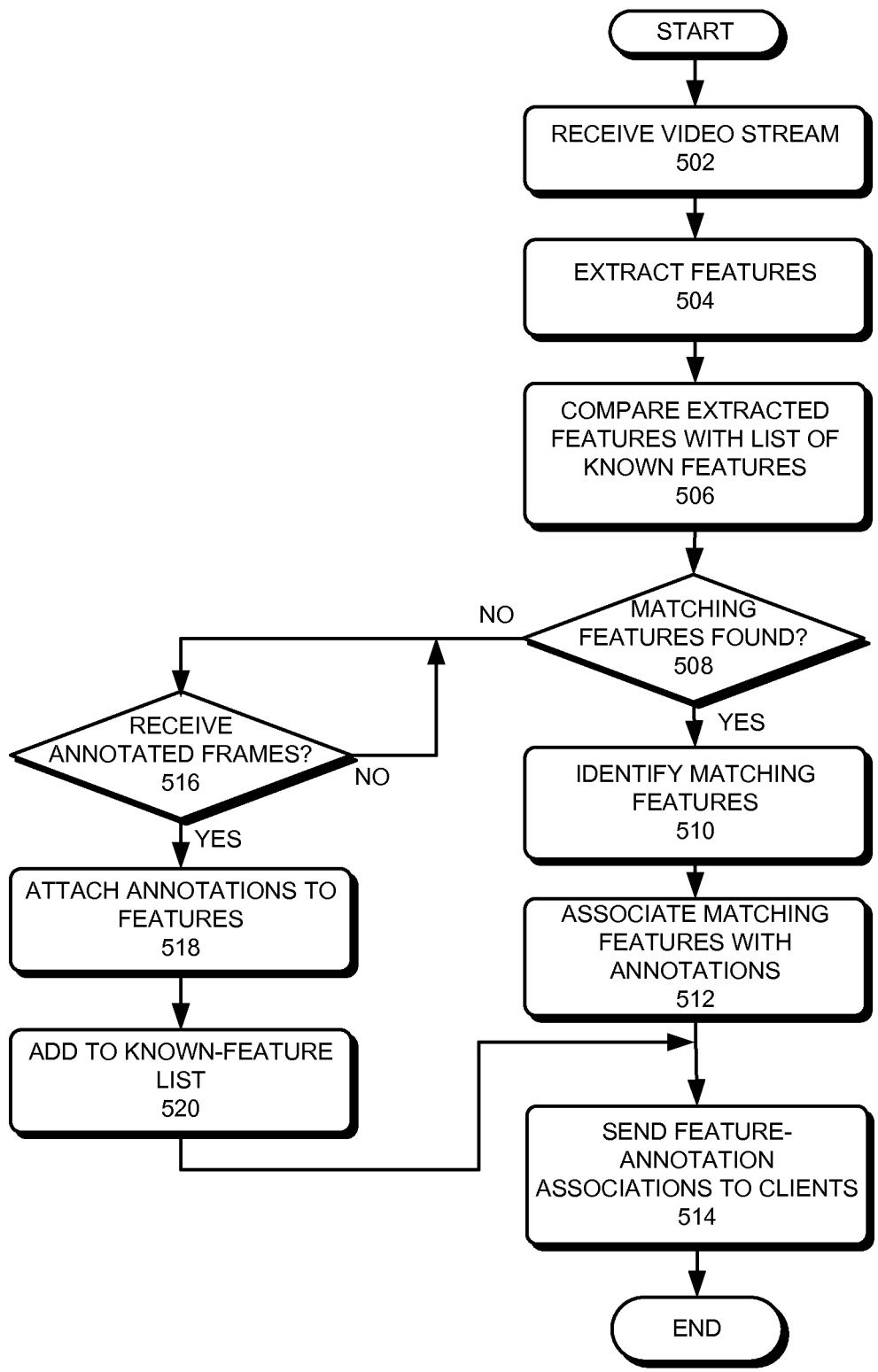
FIG. 5 presents a flowchart illustrating an exemplary server process for annotation mapping and distribution, in accordance with an embodiment of the present invention.

FIG. 5 presents a flowchart illustrating an exemplary server process for annotation mapping and distribution, in accordance with an embodiment of the present invention. During operation, the annotation or AR server receives a video stream (operation 502). In one embodiment, the video stream is received from a video reflector, which reflects videos originating from a remote field camera. The annotation server extracts features from the received video stream (operation 504), and compares the extracted features with a list of known features (operation 506). The known features are features that have been associated with available annotations previously. Based on the comparison, the annotation server determines whether there are any matching features corresponding to the available annotations (operation 508). Note that, if the list of known features is empty, then no matching features can be found. If there are matching features corresponding to the available annotations, the annotation server identifies those matching features (operation 510), and associates these matching features with the available annotations (operation 512). The associations between the annotations and features are then sent to the clients, including the field client and a web-based client (operation 514).

If there are no matching features corresponding to the available annotations, the annotation server waits to receive annotated video frames from an expert user via a web-based client (operation 516). Once in receipt of the annotated video frame, the annotation server identifies the user-defined annotation objects (such as text description or arrows) and attaches these annotation objects to corresponding features in the videos (operation 518). In one embodiment, while attaching the annotations to corresponding features, the annotation server applies a set of rules, which can be system default or defined by the user). The features and the attached annotations are stored in the list of known features (operation 520), and the associations are sent to a number of clients (operation 514).

Note that, compared with conventional AR technologies where the video capturing, feature tracking, and feature-to-annotation mapping are performed by a same machine, embodiments of the present invention allow these tasks to be distributed among multiple machines. Hence, a computationally limited device, such as a smartphone, can provide its users with an AR experience by offloading the computationally costly feature-to-annotation mapping task to a remote server. Moreover, the system provides dynamic multi-user support, in which an expert user views the scene at a local client, defines objects in the scene dynamically, with these objects being tracked frame by frame and displayed to other users, such as a user of a remote client. This ability allows the local expert (or experts) to provide operation instructions (in the form of annotations) to a remote novice user. For example, in the setting of remote assisted servicing, the remote novice user streams live video scenes to the expert user and the AR server via a video reflector. The expert user annotates the video frames, with the annotations providing detailed service instructions, and sends the annotations to the AR server. The AR server attaches the annotations to features in the videos, and sends the annotation-feature attachment result to the remote novice user. The annotation-feature attachment result enables the annotations to be correctly aligned with features in the video (as defined by the expert) and displayed to the remote novice user. Therefore, although geographically separated, the remote novice user and the local expert can have live annotation-assisted video interactions.

Computer System

Figure 6:
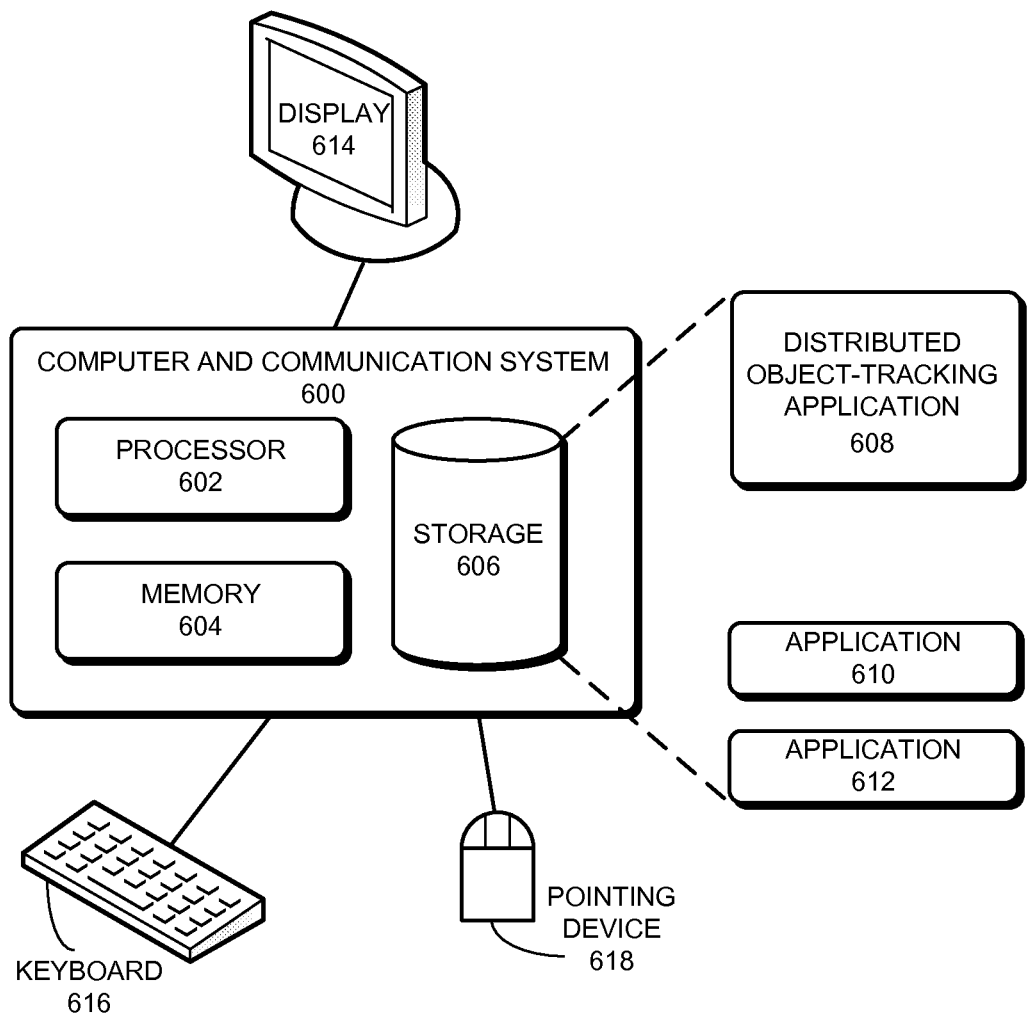
FIG. 6 illustrates an exemplary computer system for distributed object tracking, in accordance with one embodiment of the present invention.

FIG. 6 illustrates an exemplary computer system for distributed object tracking, in accordance with one embodiment of the present invention. In one embodiment, a computer and communication system 600 includes a processor 602, a memory 604, and a storage device 606. Storage device 606 stores a distributed object-tracking application 608, as well as other applications, such as applications 610 and 612. During operation, distributed object-tracking application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for tracking and distributing annotations for a video stream, the method comprising:
    receiving, at an annotation server, the video stream originating from a remote field computer;
    extracting a number of features from the received video stream;
    identifying a group of features that matches a known feature group, wherein the known feature group is associated with an annotation;
    associating the identified group of features with the annotation;
    forwarding the identified group of features and the annotation to the remote field computer, thereby facilitating the remote field computer to associate the annotation with a group of locally extracted features and display the video stream with the annotation placed in a location based at least on locations of the locally extracted features;
    receiving, from a client computer, a video frame extracted from the video stream, wherein the video frame includes annotations added by a user of the client computer;
    attaching the annotations to corresponding features within the video frame based on one or more user-definable rules associated with the annotations; and in response to receiving, from the user, updates to the user-definable rules, reattaching the annotations to features within the video frame based on the updated user-definable rules.

2. The method of claim 1, further comprising:
receiving, from the user, updates to the annotations; and
reattaching the updated annotations to features within the video frame.

3. The method of claim 1, further comprising storing the corresponding features and the attached annotations as known features in a database.

4. The method of claim 1, further comprising tracking the identified group of features frame by frame in the received video stream.

5. The method of claim 1, wherein receiving the video stream involves a video reflector, which reflects the video stream originating from a remote field computer to the annotation server and at least one other client computer.

6. A non-transitory computer-readable storage medium storing instructions that when executed by a computer cause the computer to perform a method for tracking and distributing annotations for a video stream, the method comprising:
receiving the video stream originating from a remote field computer;
extracting a number of features from the received video stream;
identifying a group of features that matches a known feature group, wherein the known feature group is associated with an annotation;
associating the identified group of features with the annotation;
forwarding the identified group of features and the annotation to the remote field computer, thereby facilitating the remote field computer to associate the annotation with a group of locally extracted features and display the video stream with the annotation placed in a location based at least on locations of the locally extracted features;
receiving, from a client computer, a video frame extracted from the video stream, wherein the video frame includes annotations added by a user of the client computer;
attaching the annotations to corresponding features within the video frame based on one or more user-definable rules associated with the annotations; and
in response to receiving, from the user, updates to the user-definable rules, reattaching the annotations to features within the video frame based on the updated user-definable rules.

7. The computer-readable storage medium of claim 6, wherein the method further comprises:
receiving, from the user, updates to the annotations; and
reattaching the updated annotations to features within the video frame.

8. The computer-readable storage medium of claim 6, wherein the method further comprises storing the corresponding features and the attached annotations as known features in a database.

9. The computer-readable storage medium of claim 6, wherein the method further comprises tracking the identified group of features frame by frame in the received video stream.

10. The computer-readable storage medium of claim 6, wherein receiving the video stream involves a video reflector, which reflects the video stream originating from a remote field computer to the annotation server and at least one other client computer.

11. An annotation server, comprising:
a processor; and
a storage device coupled to the processor and storing instructions which when executed by the processor cause the processor to perform a method, the method comprising:
receiving a video stream originating from a remote field computer;
extracting a number of features from the received video stream;
identifying a group of features that matches a known feature group, wherein the known feature group is associated with an annotation;
associating the identified group of features with the annotation;
forwarding the identified group of features and the annotation to the remote field computer, thereby facilitating the remote field computer to associate the annotation with a group of locally extracted features and display the video stream with the annotation placed in a location based at least on locations of the locally extracted features:
receiving, from a client computer, a video frame extracted from the video stream, wherein the video frame includes annotations added by a user of the client computer;
attaching the annotations to corresponding features within the video frame based on one or more user-definable rules associated with the annotations; and
in response to receiving, from the user, updates to the user-definable rules, reattaching the annotations to features within the video frame based on the updated user-definable rules.

12. The annotation server of claim 11, wherein the method further comprises receiving, from the user, updates to the annotations, and reattaching the updated annotations to features within the video frame.

13. The annotation server of claim 11, wherein the method further comprises storing the corresponding features and the attached annotations as known features in a database.

14. The annotation server of claim 11, wherein the method further comprises tracking the identified group of features frame by frame in the received video stream.

15. The annotation server of claim 11, wherein receiving the video stream involves a video reflector, which reflects the video stream originating from a remote field computer to the annotation server and at least one other client computer.

* * * * *